Nov. 8, 1966  P. C. BODETT ETAL  3,283,753

SUBBASE FOR HOT AIR FURNACE

Filed Dec. 6, 1965  5 Sheets-Sheet 1

INVENTOR.
PETER C. BODETT
PAUL W. FAIR
BY
Barnes, Kisselle, Raisch & Choate

ATTORNEYS

Nov. 8, 1966   P. C. BODETT ETAL   3,283,753
SUBBASE FOR HOT AIR FURNACE
Filed Dec. 6, 1965   5 Sheets-Sheet 2
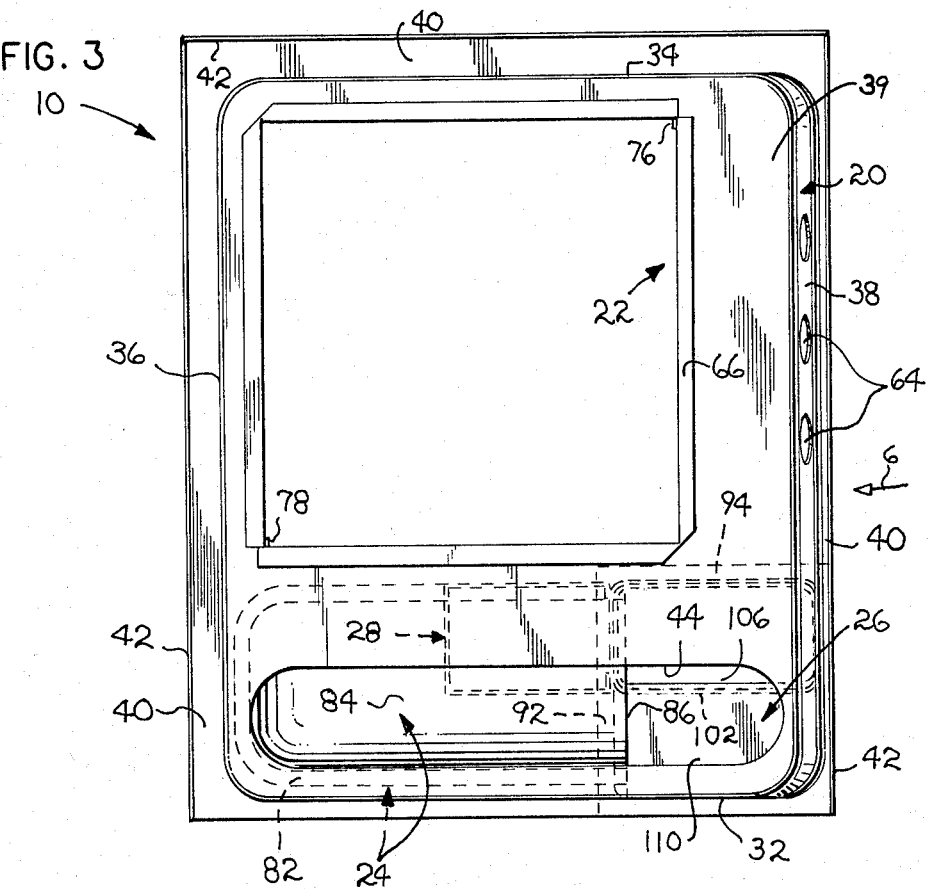
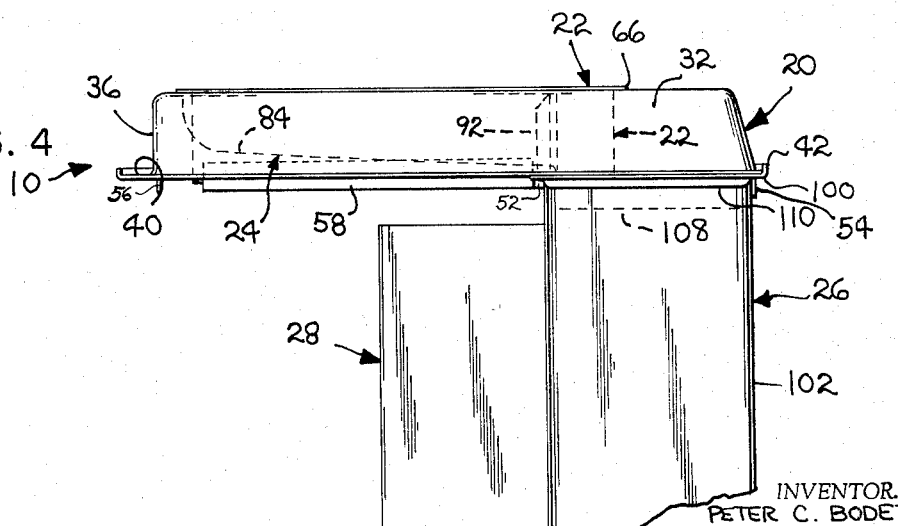
INVENTOR.
PETER C. BODETT
PAUL W. FAIR
BY
Barnes, Kisselle, Raisch & Choate
ATTORNEYS

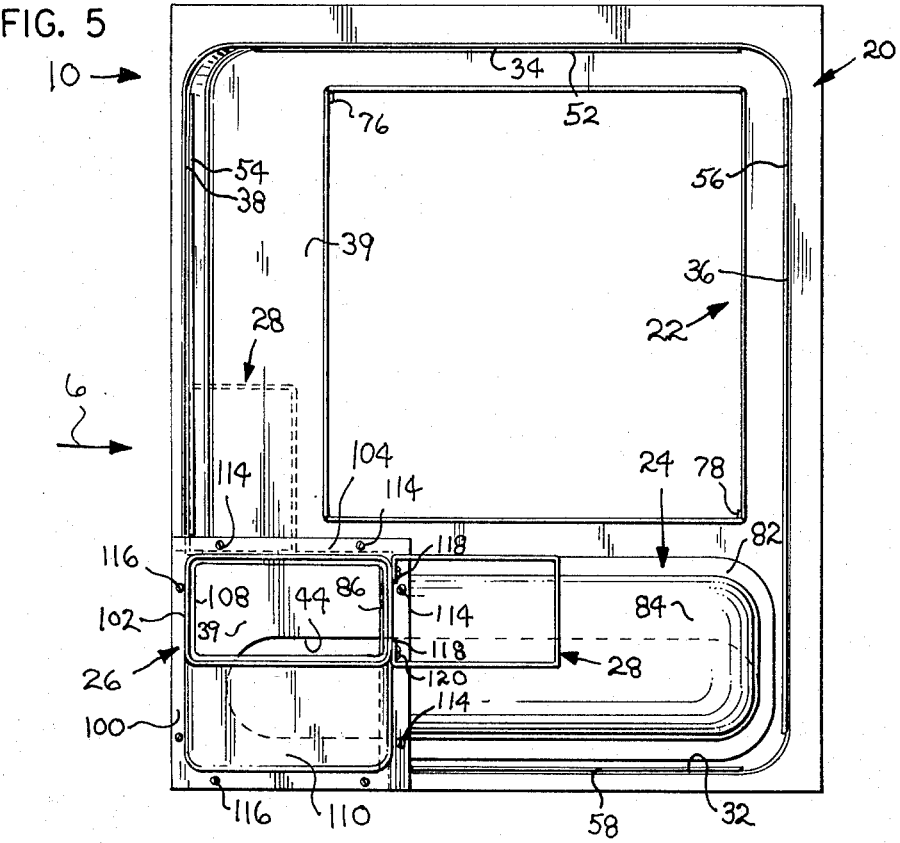
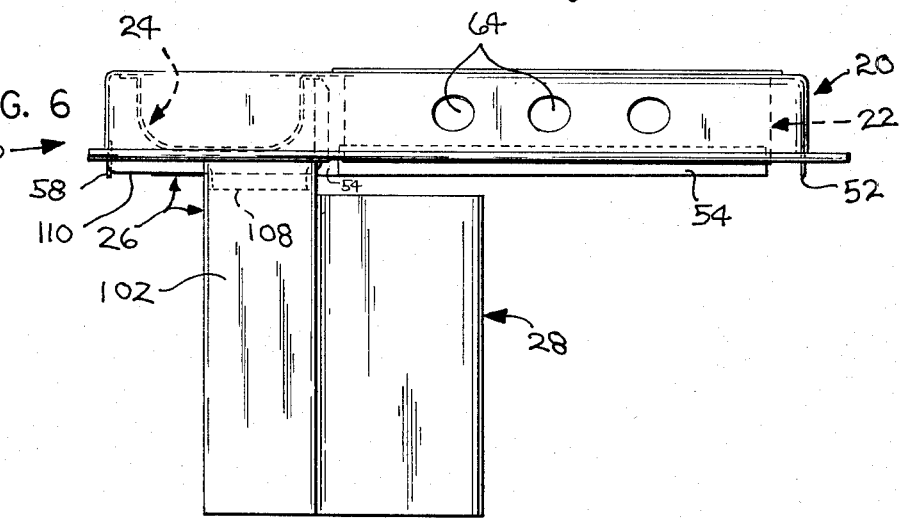

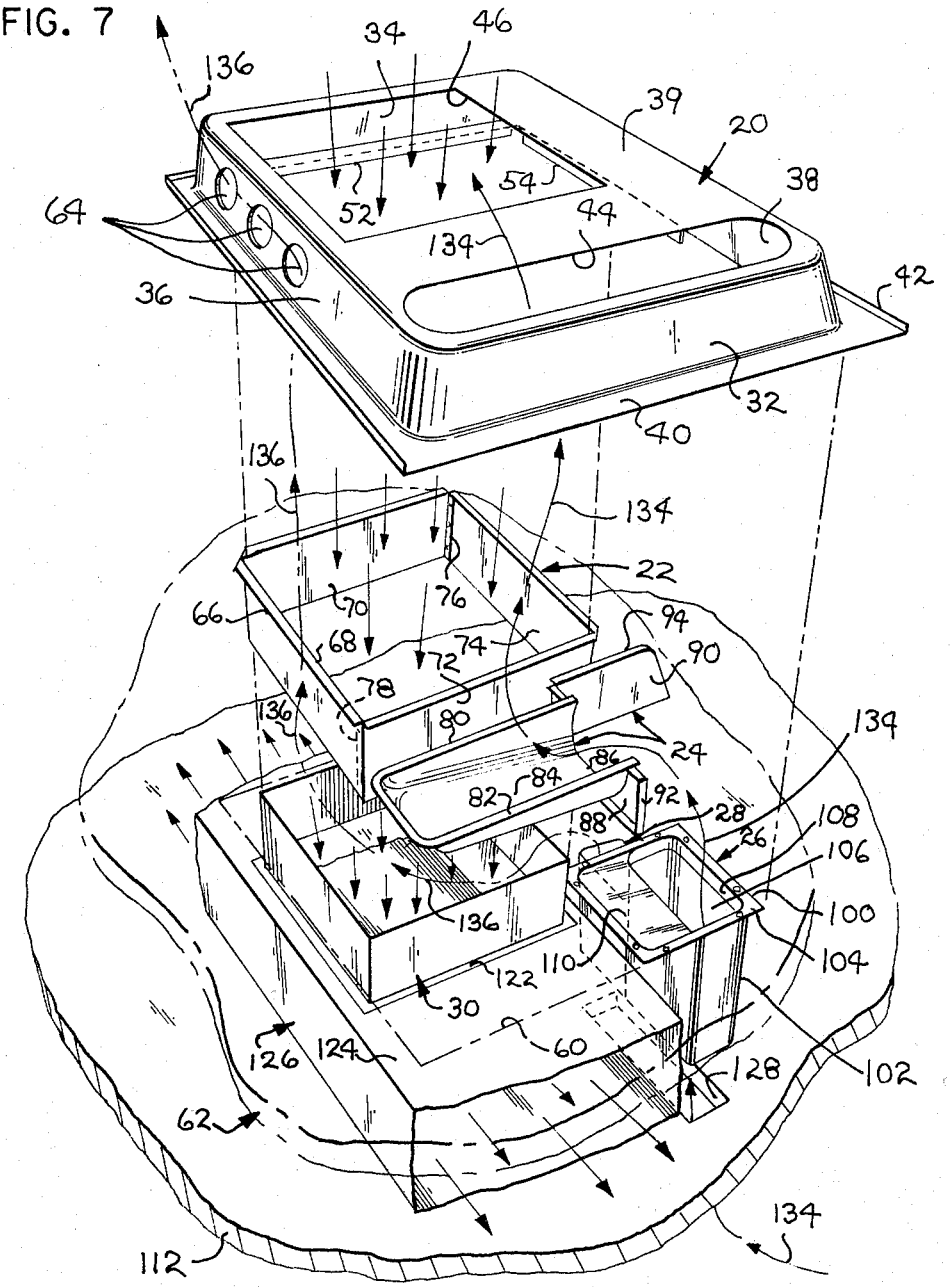

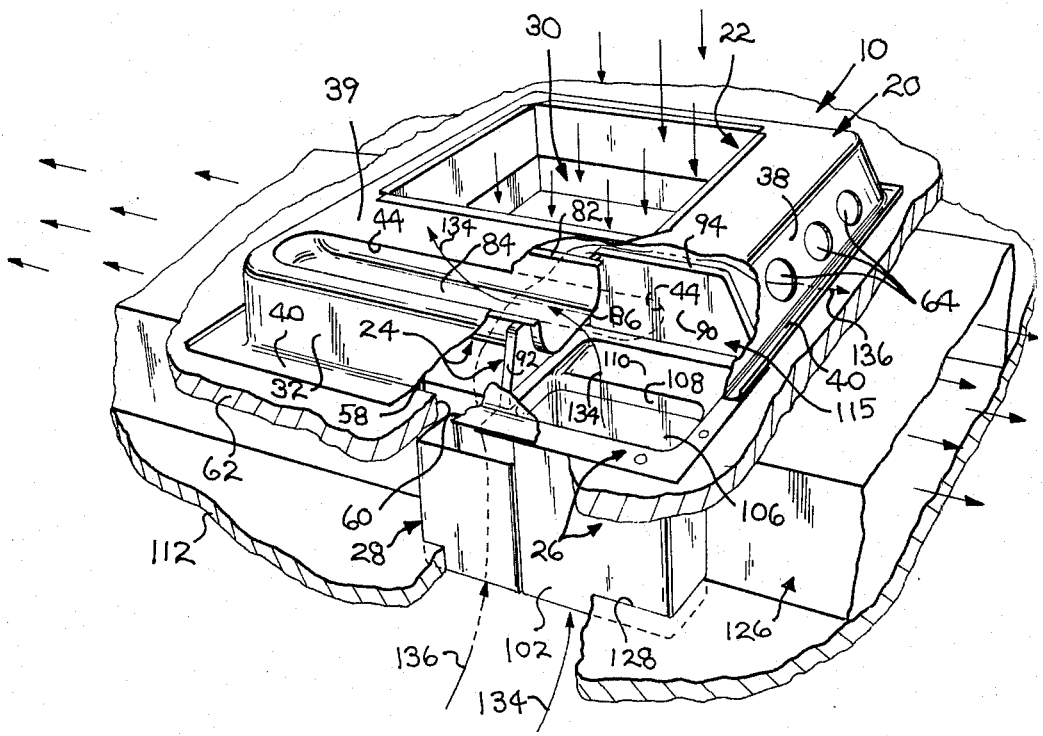

United States Patent Office 3,283,753
Patented Nov. 8, 1966

3,283,753
SUBBASE FOR HOT AIR FURNACE
Peter C. Bodett and Paul W. Fair, Sturgis, Mich., assignors to Motor Wheel Corporation, Lansing, Mich., a corporation of Ohio
Filed Dec. 6, 1965, Ser. No. 511,819
10 Claims. (Cl. 126—110)

This invention relates to heating and ventilating apparatus and in particular to a subbase for a forced hot air furnace of the type adapted for installation in mobile homes, travel trailers or other inhabited structures of a similar nature where the duct for distributing hot air from the furnace is located between or beneath the floor structure of the space to be heated.

Among the objects of the present invention are to provide an improved subbase for a forced hot air furnace which provides a support for the furnace, insures correct spacing of the furnace and duct connections away from combustible materials, connects the hot air outlet of the furnace to a subfloor heat duct, conducts combustion air from outside atmosphere up through the floor of the mobile home and into the furnace burner compartment, and conducts fresh air from outside atmosphere up through the floor in heat exchange relationship with the room heating hot air being discharged from the furnace and thence into the room air inlet of the furnace to thereby provide makeup air for ventilating and humidifying purposes.

A further object is to provide a subbase for a forced hot air furnace which accomplishes the aforementioned objects and in addition provides alternate orientation of the air intake duct work of the subbase to accommodate variations in mobile home construction, thereby permitting the use of a standardized base design which can be readily adjusted during installation to clear obstructions which may be encountered in the field.

Another object is to provide a subbase of the above character which provides a sealed passage for delivering combustion air from an exterior inlet to the burner and which also serves as a drain outlet for spilt fuel and as a pipe passage to facilitate installation of fuel lines.

Still another object of the present invention is to provide a subbase of the above character which is made substantially entirely of die formed sheet metal parts readily assembled into an attractive, efficient and economical unit.

Other objects, features and advantages of the present invention will become apparent from the following detailed description taken in conjunction with the accompanying drawings wherein:

FIG. 3 is a top plan view on an enlarged scale of the subbase of FIG. 2.

FIG. 4 is a front elevational view of the subbase shown in FIG. 3.

FIG. 5 is a bottom plan view illustrating the underside of FIGS. 3 and 4.

FIG. 6 is a side elevation view of the right hand side of the subbase viewed looking in the direction of the arrow 6 in FIGS. 3 and 5, but with a fresh air intake tube relocated to the dotted line position illustrated in FIG. 5.

FIG. 7 is an exploded perspective view of the subbase of FIGS. 1–6 illustrating the arrangement of the component parts relative to a hot air duct located between main and subflooring on which the subbase may be mounted, the fresh air and combustion air intake tubes being shown in an alternate position from their respective locations shown in FIGS. 1–5 and FIG. 6.

FIG. 8 is a perspective view of the subbase in assembled relation with the flooring and subfloor duct, the subfloor duct being shown running transversely of the furnace as distinguished from its front to rear orientation of FIG. 7 and the combustion air and fresh air intake tubes being shown relocated in still another position to accommodate the different orientation of the subfloor heat duct, portions of the subbase being broken away to illustrate interior details thereof.

Figure 1:
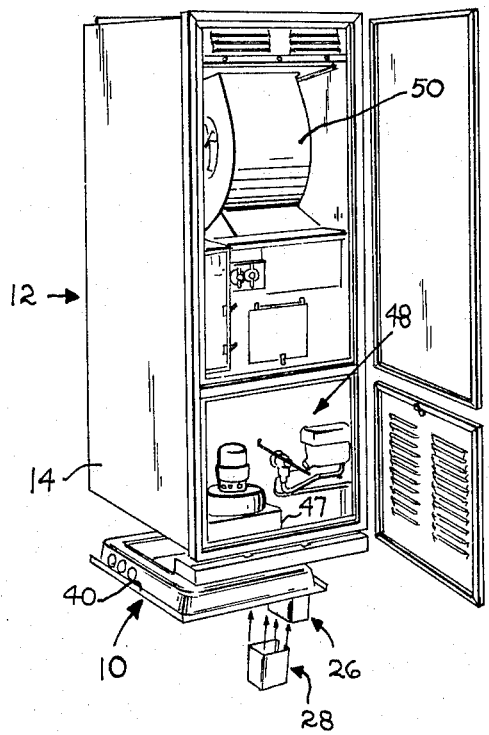
FIG. 1 is an exploded perspective view illustrating a conventional mobile home forced hot air furnance superimposed on a subbase of the invention.
Figure 2:
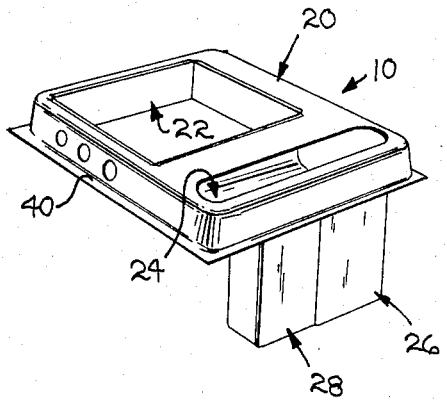
FIG. 2 is a perspective view of the subbase of the present invention shown in its assembled condition prior to installation.

Referring in more detail to the accompanying drawings, one preferred embodiment of a subbase 10 of the present invention is shown in exploded relation with a conventional mobile home forced hot air furnace of the upright floor mounted type designed for close clearance (e.g., one inch) installation in a vestibule compartment of a mobile home. Furnace 12 is enclosed in an outer casing having spaced sidewalls 14, a rear wall (not shown) and removable front panel sections the lower edges of which surround in closely spaced relation the periphery of a top panel 39 of subbase 10 (described subsequently herein), the casing edges projecting slightly below the plane of panel 39, when the interior bottom wall of the furnace is seated on panel 39. After the furnace is thus seated on the subbase, a peripheral lipped horizontal flange 40 of the subbase serves to insure a one inch spacing between the side and rear walls of the furnace casing and the corresponding walls of the vestibule when the subbase has been installed on the floor of the mobile home as described subsequently herein. Subbase 10 is thus adapted to facilitate correct location and installation of the furnace, the furnace being slid rearwardly across top panel 39 of the floor mounted subbase and into the vestibule until its lower rear edge drops off the rear of panel 39 to seat the furnace thereon so that it completely overlies panel 39 as indicated in FIG. 1.

As best seen in the exploded perspective view of FIG. 7, the complete subbase assembly comprises six sheet metal parts or subassemblies as follows: a base subassembly 20, a collar 22, a combustion air duct and baffle subassembly 24, a combustion air tube subassembly 26, a fresh air tube 28 and a duct adapter 30.

Base 20 comprises a single piece of sheet metal die formed from a piece of flat rectangular stock to provide a raised rectangular pedestal or dome formed by spaced parallel front and rear walls 32 and 34 respectively, spaced parallel extending sidewalls 36 and 38 (wall 38 being sloped inwardly as shown) and a horizontal top panel 39 integrally joined to the upper edges of the walls 32–38. The walls of base 20 are spaced from the outer periphery of the base by the horizontal marginal flange 40. The two sides and rear portion of flange 40 have their outer edges bent upwardly to form a lip 42. Panel 39 is struck out along the front edge thereof to form an oblong opening 44 which extends approximately from sidewall 36 to sidewall 38. A larger rectangular opening 46 is also struck out of panel 39, preferably being offset toward the left rear corner of panel 39 as viewed in FIGS. 7 and 3. Openings 44 and 46 are thus located to vertically align with a front mounted gas or oil burner 47 and a rear mounted hot air outlet duct (not shown) respectively of furnace 12. This is a fairly common and convenient furnace arrangement since it provides easy access to the burner and control parts in a front compartment 48. Furnace 12 has its heat exchanger located rearwardly of this compartment through which room air to be heated is forced downwardly by a top mounted blower 50. The hot air outlet (not shown) of the heat exchanger is a rectangular duct adapted to register with base opening 46 upon installation of the furnace on the base.

Base 20 also has four spacers 52, 54, 56 and 58 (FIGS. 5–7) made of rectangular strip stock and spot welded to the inner surfaces of walls 34, 38, 36 and 32 respectively. Spacers 52–58 project downwardly a predetermined distance below the plane of flange 40 (FIG. 6) and are positioned to slip into and bear against the edges of a rectangular hole 60, shown in phantom in FIG. 7, which is cut in the main or upper flooring 62 of the mobile home either during manufacture or in the field. As best seen in FIG. 8, flange 40 in the mounted position of base 10 rests on flooring 62 along the margin of hole 60, spacer 58 being visible in this view extending into hole 60 adjacent the front edge of the hole. Spacers 52–58 thus insure proper centering of base 10 relative to the floor cutout 60, which in turn insures that the through-floor hot air duct of subbase 10 is properly spaced from the combustible material of the floor in accordance with Underwriters Laboratories' specifications.

Each of the sidewalls 36 and 38 of base 20 are perforated, preferably with three spaced circular holes 64 (FIGS. 3, 6–8) located adjacent each of the sides of opening 46 for a purpose described subsequently.

Collar 22 comprises a rectangular open ended duct having a horizontal flange 66 extending outwardly from its upper end. Collar 22 is dimensioned to slip snugly into opening 46, the collar being assembled from the upper side of panel 39 downwardly into opening 46 until flange 66 rests on panel 39, flange 66 then being spot welded to panel 39 to secure collar 22 in place. The upper end of collar 22 is designed to register with the lower end of the hot air outlet duct of furnace 12 when the bottom wall of the furnace is seated on panel 39. Collar 22 extends downwardly from panel 39 and terminates at its lower end substantially flush with the plane of flange 40. Preferably collar 22 is die stamped from sheet metal, sides 68 and 70 being formed as one piece and sides 72 and 74 being formed as another single piece. Sides 70 and 72 are formed with tab 76 and tab 78 respectively (FIG. 7) which are spot welded respectively to sides 74 and 68 to form the collar subassembly.

The combustion air duct subassembly 24 comprises a die stamped sheet metal trough 80 (FIG. 7) having a horizontal U-shaped flange 82 bounding three sides thereof and a wall 84 contiguous with flange 82 along its upper edge which slopes downwardly from the closed, left hand end of the trough (as viewed in FIG. 7) to the open, right hand end 86 thereof. Duct 24 also includes an upright baffle 88 notched out to receive end 86 of the trough and being spot welded thereto (FIG. 7). Another upright baffle 90 is integrally joined to the inner end of baffle 88 and extends perpendicularly therefrom to sidewall 38 in the assembled condition of subbase 10. Baffles 88 and 90 have flanges 92 bent perpendicularly therefrom and extending around the periphery thereof, the portions of flanges 92 and 94 running along the top edges of baffles 88 and 90 being substantially coplanar with flange 82 of the trough. Duct assembly 24 is dimensioned to be received beneath opening 44 of panel 39 between wall 32 and collar 22 with flange 82 partially encircling opening 44 (FIG. 3), this flange and the top edge portions of flanges 92 and 94 being spot welded to the underside of panel 39 and forming a substantially airtight joint therewith. Likewise, the portion of flange 92 adjacent front wall 32 is designed to fit snugly thereagainst and is spot welded thereto, and the portion of flange 94 adjacent sidewall 38 is similarly secured thereto.

The combustion air tube subassembly 26 comprises a sheet metal plate 100 which is mounted on the upper end of a rectangular tube 102. Plate 100 is square shaped in plan contour (FIG. 5) and has a horizontal marginal flange 104 dimensioned to fit beneath the forward right hand corner of subbase 10 (FIG. 3) with the two inner sides of flange 104 abutting the bottom edge portions of baffle flanges 92 and 94, and with the outer two sides of flange 104 abutting the underside of the right hand corner portions of the base flange 40. Due to its square contour plate 100 can be selectively mounted in any of four positions oriented at 90° increments from one another without altering the registration of flange 104 with the abutted portions of flanges 92, 94 and 40.

As best seen in FIGS. 7 and 8, plate 100 inwardly of flange 104 has a rectangular opening 106 occupying approximately half of its area, the edge of opening 106 being defined by a downwardly extending flange 108 contiguous on three sides with flange 104 and contiguous along its fourth side (at the center of the plate) with a pan portion 110 of the plate which occupies the other half thereof. Flange 108 thus defines a rectangular spout which telescopes into the upper end of tube 102, these parts being secured together by spot welds along flange 108. Tube 102 extends downwardly from plate 100 a predetermined distance sufficient to reach from the upper surface of flooring 62 to below subflooring 112 so that it communicates at its open bottom end with the outside airspace beneath the mobile home (FIGS. 7 and 8). The combustion air tube assembly 26 is removably attached to base 20 and baffles 88 and 90 by suitable fasteners, such as sheet metal screws 114 (FIG. 5), each side of flange 104 being provided with, for example, two screw holes 116 in a symmetrical arrangement to accommodate the four position mounting of combustion air tube assembly 26 on the base. The outer two sides of flange 104, being disposed between base flange 40 and flooring 62 in the installed position of subbase 10 (FIG. 8), need not be screwed to flange 40. When thus installed, duct subassembly 26 defines with baffles 88 and 90 and the adjacent portions of front wall 32 and sidewall 38 of base 20 a chamber 115 (shown cutaway in FIG. 8) which communicates at its lower end with tube 102 via opening 106 and which communicates at one side with the combustion air duct 24 via the open end 86 thereof.

The fresh air tube 28 comprises a formed three-sided sheet metal member which is U-shaped in horizontal cross section (FIGS. 3 and 5) and has a pair of inwardly bent flanges 118 along its open side which are attached by screws 120 or other suitable fasteners to tube 102, either along a narrow side thereof as illustrated in solid lines in FIG. 5 or to one of the wide sides thereof as illustrated in broken lines in FIG. 5. Tube 28 thus extends parallel to tube 102, its open bottom end being flush with the open bottom end of tube 102 and its open top end being spaced slightly below the plane of the base flange 40.

The duct adapter assembly 30 (FIGS. 7 and 8) is a four sided sheet metal duct similar in construction to collar 22, being open at both ends and adapted to snugly telescopically receive collar 22 in its top end. Adapter 30 has a horizontal flange 122 (FIG. 7) extending outwardly from all four sides thereof near the bottom end of the adapter which is designed to seat on the upper wall 124 of a subfloor hot air distribution duct 126 to thereby support the adapter without requiring any attachment connection of the adapter to collar 22. The telescoping assembly of collar 22 and adapter 30 thus readily accommodates different spacings of duct 126 from flooring 62.

Installation of the above described subbase 10 of the present invention is best understood with reference to FIGS. 7 and 8. A rectangular hole 60 is located and cut in flooring 62, the hole being of a specified size slightly smaller than the outside dimensions of base 10. Hole 60 is normally located in the usual alcove provided in a mobile home for receiving the furnace 12. A smaller opening the size of adapter 30 is then cut in upper wall 124 of duct 126, and the adapter is placed on duct 126 via the floor opening 60. An opening 128 is then cut in the subflooring 112 of a suitable size and shape to receive tubes 102 and 28 therethrough, as shown by way of example in FIG. 8.

The location of opening 128 and its shape will depend upon the particular variation of mobile home construction encountered with each installation. For example, in FIG. 8 the underfloor duct 126 is shown extending in a direction from side to side or transversely of base 10. For such an installation, combustion air tube assembly 26 may be attached to base 10 with tube 102 disposed toward the front of the base with its lengthwise dimension parallel to the axis of duct 126. Tube 28 may then be attached to the left sidewall of tube 102 as viewed in FIG. 8 with its lengthwise dimension also parallel to the duct axis. However, should the installer find that duct 126 runs from front to rear relative to the desired location of the furnace, as shown by way of example in FIG. 7, he may readily adapt subbase 10 to this condition by attaching tube 26 in its FIG. 7 position wherein tube 102 is disposed generally in alignment with side 38 rather than in the front of the base, its lengthwise dimension extending from front to rear of the base parallel to the axis of duct 126 as oriented in FIG. 7. For this condition tube 28 is attached to the end wall of tube 102 opposite to that to which tube 28 is attached in FIG. 8, tube 28 thus being disposed generally behind baffle 90 instead of under the trough of duct 24 as in FIG. 8. It is to be understood that, in addition to the two positions of tube 26 shown respectively in FIGS. 7 and 8, tube 26 may be indexed to two additional positions one of which is shown in FIGS. 3–6. Likewise, tube 28 can be attached to any of the four walls of tube 102 as indicated in FIG. 5 by the solid and dotted line alternate positions thereof to suit the requirements of the particular installation. Once the desired orientation of tubes 102 and 28 is selected, the shape and location of hole 128 is plotted accordingly to receive these tubes.

The installation is completed by attachment of ducts 26 and 28 to the base and then lowering the subbase onto flooring 62 so that flange 40 rests on the margin of hole 60 cut in the floor. Spacers 32–38 insure proper centering of the base in the hole as the base is placed on the flooring. Then furnace 12 is installed in the alcove by resting its rear bottom edge on panel 39, whereupon the furnace may be easily pushed back into the alcove by sliding it along on panel 39 until the rear bottom edge of the furnace drops off the rear edge of panel 39, whereupon the front and side edges of the furnace casing also drop around the outer periphery of panel 39 to thereby position the furnace on the subbase. When the furnace has been pushed all the way back onto the base it will be properly positioned to bring the hot air outlet of the furnace into registry with collar 22 and to position burner 47 vertically above opening 44 of the base, and the furnace will also be properly spaced by lips 42 from the vestibule walls.

After subbase 10 and furnace 12 have been installed as described above, the fuel and power lines connected and the furnace put into operation, combustion air is supplied from the exterior airspace beneath subfloor 112, as shown by arrows 134 in FIGS. 7 and 8, the same being drawn upwardly by convection currents through tube 102, opening 106, chamber 115, thence into duct 24 and up through opening 44 to the burner to support combustion in the sealed combustion chamber of furnace 12 in the usual manner.

Subbase 10 also provides a separate passage for bringing fresh air from beneath the mobile home into the room air circulatory system of the furnace in isolated relation to the combustion air system. Thus, as indicated by arrows 136 in FIGS. 7 and 8, fresh air enters tube 28 and is drawn by the air currents induced by blower 50 up through tube 28 into the region of subbase 10 defined by the space below panel 39, inwardly of walls 32–38 and exteriorly of collar 22, adapter 30 and ducts 24 and 26. The cool fresh air while in this region is in heat exchange relation with collar 22 and adapter 30 to thereby help insulate the same from the floor edges, this heat transfer also serving to warm the incoming fresh air. The fresh air after circulating around the aforementioned interior region of subbase 10 is discharged via ports 64, these ports being spaced inwardly from the sidewalls of the vestibule so that the fresh air then rises in and helps cool the space between the rear and sidewalls of the vestibule and furnace as it is drawn to the room air inlet of the furnace.

From the foregoing description, it will now be apparent that the subbase 10 of the present invention provides many advantages from the standpoint of manufacture, installation and operation. Subbase 10 may be manufactured as a standardized base design, and yet it is readily adaptable to various duct systems and floor and subfloor framing methods merely by selectively positioning the fresh air and combustion air ducts 26 and 28 as required to assure clearance of coach cross-members and the particular orientation of the subfloor hot air distribution duct. Subbase 10 also provides "built-in" ducts 22 and 30 for connecting the hot air outlet of the furnace to the subfloor duct 126, these ducts being telescopically adjustable vertically of the assembly to accommodate different duct to floor spacings. The location of collar 22 offset toward the rear left corner of the base provides room for the combustion and fresh air ducts 26 and 28 in the right front corner of the base where the same are readily accessible to the installer. This also facilitates the installation of the fuel line connections between an exterior fuel tank and the furnace burner, the fuel lines being brought up from beneath the mobile home through duct 26, chamber 115, duct 24 and opening 44 to the burner. When the fuel lines are so installed, any spillage of fuel oil from the burner or lines will drip downwardly through opening 44 onto either trough 80, pan 110 or both, and will safely drain down tube 102 onto the ground beneath the mobile home. Due to the preferably 3° slope of bottom wall 84 of trough 80, any fuel thus spilled from the burner or fuel lines onto trough 80 will empty into tube 102 even though subbase 10 is tilted 3° from the horizontal in any direction. The combustion air ducts 26 and 24 and the associated parts of base 20 thus provide an oiltight and substantially airtight passage for delivering outside air to the burner in sealed relation to the room air circulating system of the furnace, and in addition serve as a drain outlet for spilling fuel and as a pipe passage for fuel lines. This result is achieved regardless of the alternate positioning of combustion air tube 26.

The installation versatility of the subbase results from the front corner location of duct 26, the offset position of tube 102 relative to its adapter plate 100 and the interchangeable positions of the fresh air tube 28. However the combustion air outlet 44 extends all the way across the front of the base and thus the furnace can draw its combustion air anywhere across the front of the base, thereby accommodating various burner locations, gas as well as oil burners, and increasing the efficiency of burner operation. Subbase 10 is preferably constructed as described herein of die-drawn or formed sheet metal parts, which permits manufacture and assembly to relatively close tolerances, thereby insuring accurate registry of the furnace parts with the base parts and facilitating installation.

We claim:

1. A subbase for supporting a hot air furnace on the floor of a structure to be heated wherein hot air is distributed via a subfloor duct and combustion air and makeup air are obtainable from an exterior source beneath the floor, said subbase comprising a base adapted to receive the furnace thereon and having a marginal flange adapted to rest on said floor around the periphery of an opening in said floor over said subfloor duct, said base having a horizontal top panel disposed above said flange and connected thereto by an upright wall, said panel having an opening therein, collar means supported by said top panel and extending vertically downwardly therefrom through said panel opening for connection with an opening in the subfloor duct, said collar being located for registry with the hot air outlet of said furnace for conducting heated air from the furnace downwardly through said base into the subfloor duct, said panel having an aperture located for vertical alignment beneath the burner of the furnace, a combustion air duct for supplying combustion air to the burner via said panel aperture comprising an imperforate trough open at the top thereof, closed at one end and open at an axially opposite end and being secured to said panel beneath said aperture and extending therealong, baffle means secured to the open end of said trough and defining with said trough, panel and wall a chamber communicating with the open end of said trough, combustion air tube means secured to said base at the bottom of said chamber and having an air tube communicating with said chamber and adapted to extend downwardly therefrom through said floor opening to a source of fresh air exterior to said structure, and a fresh air tube dependent from said base adapted to extend downwardly through said floor opening to a source of fresh air exterior to said structure, said fresh air tube communicating at its upper end with the region defined beneath said panel, interiorly of said wall and exteriorly of said collar means and said combustion air duct, said wall having port means for discharging fresh air from said region into the space adjacent the upright walls of the furnace.

2. The combination set forth in claim 1 wherein said combustion air tube means comprises a plate having a horizontal flange defining a square border of said plate, said plate being removably secured along said border flange to said baffle means, said plate having an opening therein rectangular in configuration and occupying approximately half the width and the full length of said plate within said border flange, said combustion air tube being aligned with said opening and thereby offset toward one side of said plate, the other half of said plate inwardly of said border flange comprising a generally horizontal pan, said plate being disposed below the elevation of the open end of said trough whereby any fuel spilled from the burner and dripping onto said trough drains from the open end of said trough onto said plate and thence into said combustion air tube via said plate opening for discharge to the exterior of said structure, said plate being mountable in any one of four positions oriented at 90° increments from one another to thereby vary the position of said offset combustion air tube to accommodate variations in the construction of said floor and different orientations of said subfloor duct without thereby interfering with the conduction of spilled fuel through the combustion air duct.

3. The combination set forth in claim 2 wherein said plate has a dependent flange defining a spout around said plate opening, said combustion air tube is open at its top and bottom ends and is rectangular in horizontal cross section complemental to the configuration of said spout for telescopically receiving the spout in its top end, and said fresh air tube is a three-sided member generally U-shaped in horizontal section open at its top and bottom ends and approximately the same width as said combustion air tube, said fresh air tube being secured at its open side to one vertical side of said combustion air tube whereby said one vertical side forms the fourth side wall of said fresh air tube.

4. The combination set forth in claim 1 wherein said collar means comprises a relatively short first duct open at its top and bottom ends and extending through said panel and having a peripheral horizontal flange at its upper end resting on said panel, the lower end of said first duct being generally flush with the plane of said base flange, said collar means also including a second duct open at its top and bottom ends with its top end slidably telescoped with the bottom end of said first duct, the bottom end of said second duct being adapted for insertion into an opening of said floor duct, said second duct having a horizontal flange extending outwardly therefrom adjacent the bottom end thereof adapted to rest on said sub-floor duct around the periphery of said sub-floor duct opening.

5. The combination set forth in claim 1 wherein said base wall has means projecting downwardly therefrom below the plane of said base flange and inwardly thereof and adapted for insertion into said floor opening adjacent the edges thereof for locating said subbase in a predetermined position relative to said floor opening, said collar means being spaced inwardly of said projecting means to provide an insulating air space therebetween.

6. The combination set forth in claim 1 wherein said port means comprise a plurality of holes located in said wall adjacent said collar means for inducing flow of the make-up air from said fresh air tube past the sides of said collar means to said holes.

7. The combination set forth in claim 1 wherein said base flange is rectangular in horizontal plan and has a pair of spaced parallel portions at the opposite sides of said base adapted to space the upright sides of the casing of the furnace from the corresponding vertical walls of a furnace-receiving vestibule of the structure, said side portions of said flange having an upturned lip extending along the outer edge thereof.

8. The combination set forth in claim 1 wherein said panel is generally rectangular in horizontal plan and said panel opening and said collar means are likewise rectangular in horizontal cross section, said panel opening being offset toward one rear corner of said panel, said panel aperture being located adjacent the front edge of said panel and extending thereacross, and said chamber being located beneath a front corner of said panel diagonally opposite said one rear corner.

9. The combination set forth in claim 1 wherein said trough has a sloping bottom wall inclined downwardly from said closed end to said open end thereof.

10. A subbase for supporting a hot air furnace on the floor of a structure to be heated wherein the heat is distributed via a sub-floor duct, said subbase comprising a base adapted to receive the furnace thereon and to rest on the floor around the periphery of an opening in said floor over said sub-floor duct, said base having a raised pedestal defined by a horizontal top panel and an upright wall contiguous with the outer periphery of said panel, said panel having an opening therein, collar means extending vertically downwardly through said panel opening for conducting heated air from the furnace downwardly through said base toward the sub-floor duct, said panel having an aperture located for vertical alignment beneath the burner of the furnace, a combustion air duct for supplying combustion air to the burner via said panel aperture comprising an imperforate trough disposed beneath said aperture, and means defining with said trough a chamber communicating via said trough with said panel aperture, combustion air tube means connected to said combustion air duct and having an air tube communicating with said chamber and adapted to extend downwardly therefrom through said floor opening to a source of fresh air exterior to said structure, and a fresh air tube dependent from said base adapted to extend downwardly through said floor opening to a source of fresh air exterior to said structure, said fresh aid tube communicating at its upper end with the region defined beneath said panel, interiorly of said wall and exteriorly of said collar means and said combustion air duct, said subbase having port means for discharging fresh air from said region into the space adjacent the vertical sides of the furnace.

References Cited by the Examiner
UNITED STATES PATENTS 2,473,562   6/1949   Barnes.
3,067,735   12/1962  Albert _____ 126—110

JAMES W. WESTHAVER, *Primary Examiner.*